Oct. 1, 1968 C. L. MARSHALL 3,404,334

COLOR TELEVISION TEST APPARATUS

Filed May 8, 1967

INVENTOR.
CECIL L. MARSHALL

BY

Woodard, Weikart, Emhardt & Naughton
Attorneys 3,404,334
COLOR TELEVISION TEST APPARATUS
Cecil L. Marshall, 406 Brewer Drive,
Greenwood, Ind. 46142
Filed May 8, 1967, Ser. No. 636,812
11 Claims. (Cl. 324—20)

ABSTRACT OF THE DISCLOSURE

A color television picture tube with ninety degree deflection yoke and a plug mounted to the tube case and wired to the deflection coils. An adaptor assembly including a socket connected to the plug and thereby mounting the adaptor box on the picture tube case. A second socket in the box and connected by a plug and cable to the horizontal and vertical output stage terminal clips of the color television receiver being tested, the color tube thereof being disconnected from the output stages. Resistance means mounted on the first socket and placing resistance across the coupling from the seventy degree vertical output stages of the receiver tested to vertical coils of the ninety degree deflection yoke of the test unit. Capacitors mounted on the first socket and placing capacitance across the coupling of the seventy degree output stages to the horizontal coils of the ninety degree yoke.

*Background of the invention*

*Field of the invention.*—This invention relates generally to color television and more particularly means for coupling and matching a ninety degree color television picture tube and deflection yoke in a test jig to the horizontal and vertical deflection output stages of a color television receiver having a seventy degree picture tube and deflection yoke, the latter being the receiver to be tested.

*Description of the prior art.*—In the color television service business, a problem which has existed has been the difficulty of accurately determining at a customer's home whether or not a receiver malfunction is caused by circuitry or by the picture tube. This problem has been overcome by my invention of a portable test jig which includes a color picture tube and cables connectable to output circuitry of the receiver in question, to determine whether or not the circuitry is functioning properly. The test jig typically employs a ninety degree color tube which is perfectly satisfactory for checking receivers having outputs designed for driving a ninety degree deflection yoke. Most nineteen inch, twenty-two inch, and twenty-five inch receivers are in this category. However, most twenty-one inch receivers employ a seventy degree tube and deflection yoke and corresponding output circuitry. Employment of the ninety degree test jig with seventy degree output stages may result in some reduction of overall picture height on the test jig as well as some oscillation or ringing in the horizontal scan, which can be objectionable.

*Summary*

The present invention includes in the coupling of the test jig to the tested receiver some resistance and capacitance of suitable value and location and in a convenient way to adapt the ninety degree yoke to the seventy degree output stages.

*Description of the preferred embodiment*

Figure 1:
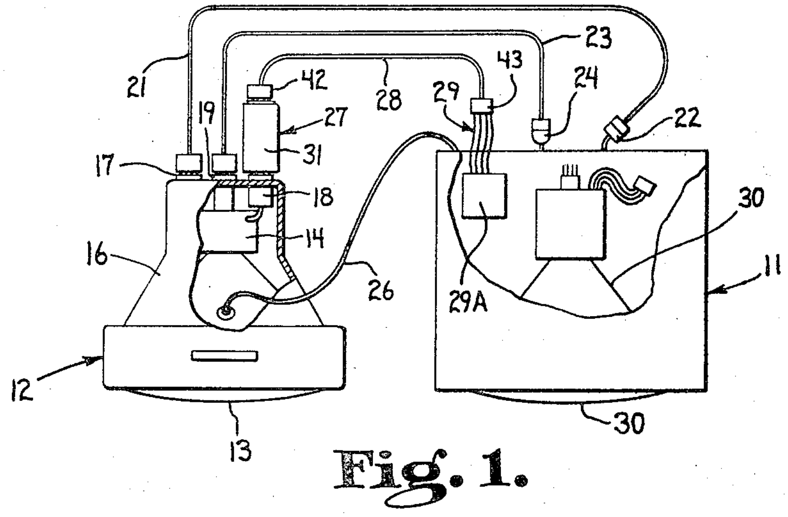
FIG. 1 is a top plan view illustrating a typical embodiment of the present invention during the test of a television receiver by the use of a test jig.
Figure 2:
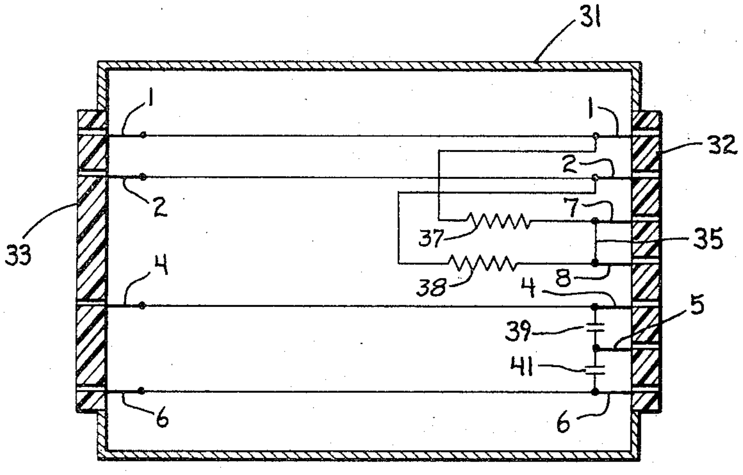
FIG. 2 is a longitudinal section through an adaptor according to a typical embodiment, but showing the adaptor schematically rather than being representative of the actual arrangement of the pin holes in the sockets themselves.
Figure 3:
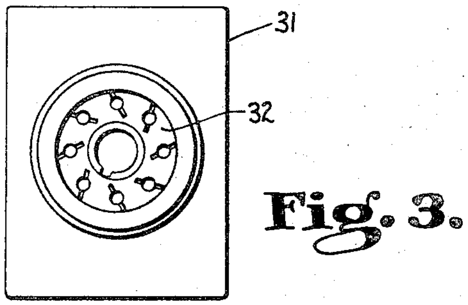
FIG. 3 is an end view of the adaptor showing one of the two sockets as the sockets actually appear in the device.

Referring now to the drawings in detail, FIGURE 1 shows the television receiver 11 which is to be tested and the portable test jig 12, both in plan view. The test jig includes a tube 13 therein having a ninety degree deflection yoke 14 thereon, the tube being mounted securely in the case 16, with the deflection yoke mounted on the tube in conventional manner. Three plugs are provided on the rear of the test jig, plugs 17 and 18 being securely mounted to the case and connected respectively to convergence windings and deflection coils on the yoke assembly. The plug 19 is on the rear end of the color tube itself.

A suitable cable 21 is provided with suitable connectors and wirings for connection between the convergence plug 17 and the convergence output circuitry at socket 22 of the television receiver 11. Similarly a suitable cable and connector assembly 23 is provided between the tube plug and socket 24 in the television receiver. Also the high voltage connector 26 is provided between the test jig and the television receiver output therefor.

According to the illustrated embodiment of the present invention, the plug 18 has an adaptor assembly 27 mounted thereto from which a cable assembly 28 extends to the leads 29 from horizontal and vertical output stages 29A of the television receiver. These leads as well as the other previously mentioned picture tube outputs from the receiver are disconnected from the picture tube 30 of the receiver during the test.

The adaptor assembly 27 includes a box 31 having octal sockets 32 and 33 mounted thereto. Terminals 1 and 2 of socket 32 are provided for the vertical deflection signal supply to the vertical deflection coils of the deflection yoke in the test jig. Similarly terminals 4 and 6 of the socket 32 are provided for the horizontal deflection signal supply to the horizontal deflection coils of the test jig deflection yoke. This socket 32 is located flush with the front face of the box 31 so that the entire box can be mounted to the end of the test jig case 16 by mounting the socket 32 on the plug 18.

The adaptor box also includes the octal socket 33 with the terminals 1 and 2 thereof wired directly to terminals 1 and 2 of the socket 32, respectively. Similarly terminals 4 and 6 thereof are wired directly to terminals 4 and 6 of socket 32.

To provide the shunt resistance at the vertical deflection signal coupling, a jumper 35 is connected across terminals 7 and 8 of socket 33 and a resistor 37 is connected between terminals 1 and 7 of socket 32 and a resistor 38 is connected between terminals 2 and 8 of the socket 32, these connections being made behind the face of the socket so as to avoid interference with the plug which is used to connect the television chassis with the socket as will be described. A typical value for each of these resistors is 290 ohms. Other values between 280 and 320 ohms might be selected for best results depending upon characteristics of the output circuitry of the majority of receivers to be tested.

Further according to the invention, a capacitor 39 is connected between an unused terminal 5 and terminal 4 of the socket 33. Similarly capacitor 41 is connected between unused terminal 5 and terminal 6. A typical value for each of these capacitors is 330 micromicrofarads with a 6 kv. rating. A plug 42 of the cable assembly 28 is connected to the socket 33, and a socket 43 is provided at the other end of the cable. Two terminals of the socket 43 receive terminal clips from the vertical output stages of the television receiver 11, these being the yoke terminal clips of the receiver which, for the test operation, are disconnected from the yoke of the television receiver. Corresponding leads in the cable 28 provide these outputs to the terminals 1 and 2 of the socket 33. Similarly, the supply from the horizontal output stages to terminals 4 and 6 of the socket 33 are provided from horizontal output stages of the receiver through two of the yoke terminal clips connected thereto and received in appropriate terminal holes of the socket 43, these clips as well as the vertical yoke terminal clips being part of the group designated by reference numeral 29 in FIGURE 1.

From the foregoing description, it will be apparent that the series connection of the two capacitors 39 and 41 is connected across the ninety degree yoke assembly of the test jig and across the horizontal output terminal clips of the television receiver. They are selected to prevent ringing in the ninety degree yoke assembly. The resistors 37 and 38 are, in effect, connected in series across the terminals 1 and 2 supplying the vertical deflection coils and are selected to decrease the time constant from the vertical output stage of the receiver to the yoke assembly of the test jig tube sufficiently to provide full picture height on the ninety degree picture tube of the test jig. Whereas the capacitors changed the phase relationship between the horizontal output transformer of the television receiver and the test jig yoke to prevent ringing, the resistors change the load resistance across the vertical output stage and the vertical deflection coils of the test jig tube yoke to provide full picture height. To convert the test jig from test of a seventy degree receiver, to a ninety degree receiver, all one need do is simply unplug the socket 32 from the plug 18 of the test jig and connect a cable directly from this socket to the vertical and horizontal yoke terminal clips from the output stages of the ninety degree television receiver.

It is believed that from the foregoing description it will be apparent that the present invention is eminently well suited to the intended objective. While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Color television test apparatus for display on a ninety degree television picture tube of an image derived from signals produced by output circuitry for a seventy degree picture tube, said apparatus comprising:
a body having first and second connector means thereon,
said first connector means having first and second sets of terminal means therein for supplying respectively vertical and horizontal deflection signal inputs to deflection coils of a ninety degree tube deflection yoke,
said second connector means having first and second sets of terminal means therein for receiving respectively vertical and horizontal deflection signal outputs from output circuitry of a seventy degree television receiver;
resistance means connected to one of said first sets of terminals;
and capacitor means connected to one of said second sets of terminals.

2. The apparatus of claim 1 and further comprising:
a test fixture having a ninety degree color tube and yoke assembly therein,
third connector means coupled to said yoke assembly, said first connector means being connected to said third connector means;
a cable assembly having a fourth connector means thereon, said fourth connector means being connected to said second connector means, and said cable assembly having fifth connector means thereon,
and a television receiver having horizontal and vertical output terminals connected to horizontal and vertical stages matched to a seventy degree color tube yoke and disconnected therefrom, said output terminals being connected to said fifth connector means.

3. The apparatus of claim 1 wherein said body is a box and said first and second connector means are respectively first and second octal sockets affixed to opposite ends thereof to permit mounting of said first socket directly to a plug rigidly mounted in test apparatus for support of said box thereon, while a cable plug is simultaneously connectable to said second socket.

4. Color television test apparatus for display on a ninety degree television picture tube of an image derived from signals produced by output circuitry for a seventy degree picture tube, said apparatus comprising:
first connector means,
said first connector means having first and second sets of terminal means therein for supplying respectively vertical and horizontal deflection signal inputs to deflection coils of a ninety degree tube deflection yoke,
conductor means coupled to said first and second sets of terminal means and connectable to output circuitry of a seventy degree television receiver for receiving vertical and horizontal deflection signal outputs from output circuitry of such receiver,
resistance means connected to said first set of terminal means,
and capacitor means connected to said second set of terminal means.

5. The apparatus of claim 4 and further comprising:
a test fixture having a ninety degree color tube and yoke assembly therein,
second connector means coupled to said yoke assembly, said first connector means being connected to said second connector means,
said conductor means including a cable assembly,
and a television receiver having horizontal and vertical output terminals connected to horizontal and vertical stages matched to a seventy degree color tube yoke and disconnected therefrom, said output terminals being connected to said cable assembly.

6. The apparatus of claim 5 wherein:
said resistance means are, in effect, across the terminals of said first set coupled to said yoke assembly and are of values selected to decrease the time constant from the said vertical output stage to said yoke assembly and thereby match the seventy degree output stage to the ninety degree yoke assembly,
and said capacitor means are in parallel with said yoke assembly across said horizontal output terminals and selected to prevent ringing in said ninety degree yoke assembly.

7. The apparatus of claim 4 wherein:
each of said sets of terminal means includes two terminals,
said resistance means includes a first resistor connected from one of the vertical signal receiving terminals of said first connector means to another terminal of said first connector means,
and said resistance means further includes a second resistor connected from a second of the vertical signal terminals of said first connector means to said another terminal of said first connector means.

8. The apparatus of claim 7 wherein:
the resistance of each of said resistors is between 280 and 320 ohms.

9. The apparatus of claim 4 wherein:
said capacitance means are connected across the two terminals of said second set.

10. The apparatus of claim 4 wherein:

said capacitance means includes a first capacitor connected between a third terminal and one of the horizontal output signal input terminals of said first connector means, and said capacitance means includes a second capacitor connected between said third terminal and the other of the horizontal output signal terminals of said first connector means.

11. The apparatus of claim 10 wherein:

the capacitance of each of said capacitors is substantially 330 micromicrofarads.

References Cited

UNITED STATES PATENTS 2,734,167 2/1956 Bimonte et al. ______ 324—20 X

OTHER REFERENCES

Kelvin, Wm.: CRT Substitution Works!, Radio Electronics, March 1962, pp. 36–38.

RODNEY D. BENNETT, *Primary Examiner.*

T. H. TUBBESING, *Assistant Examiner.*